G. M. MERWIN.
ENSILAGE CUTTER DISTRIBUTER.
APPLICATION FILED SEPT. 5, 1913.
1,216,342.
Patented Feb. 20, 1917.
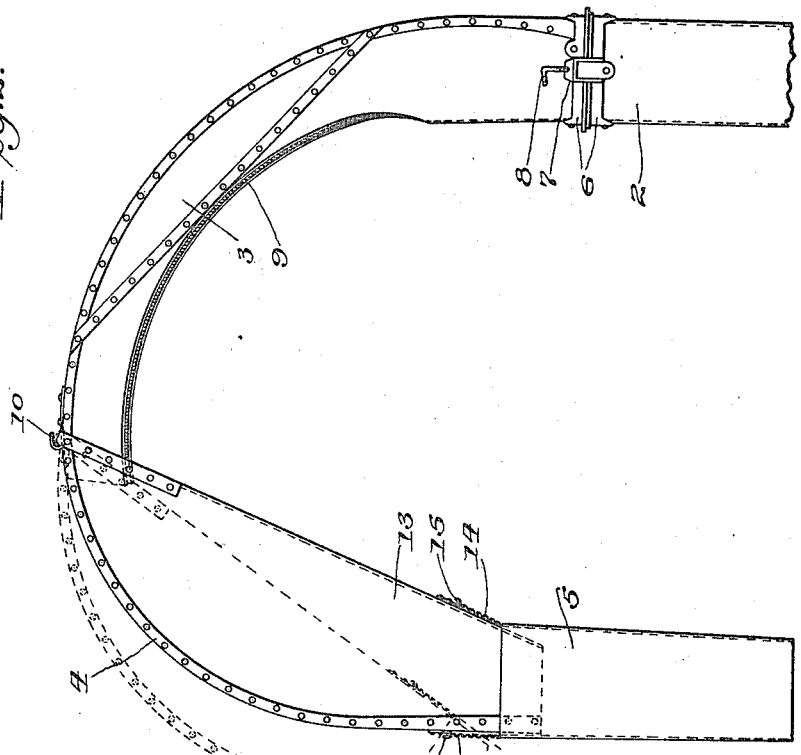
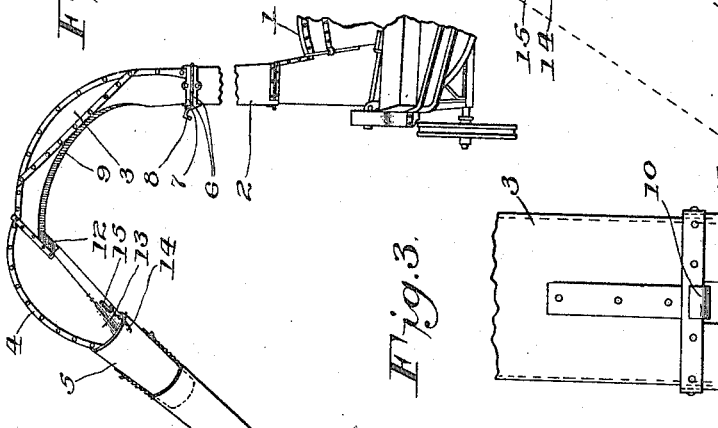
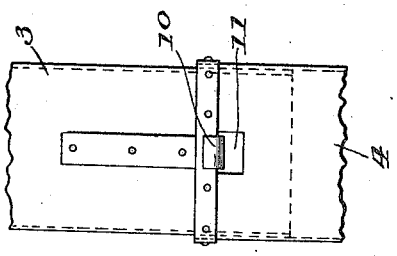
Inventor.
George M. Merwin,

UNITED STATES PATENT OFFICE.

GEORGE M. MERWIN, OF BERWYN, ILLINOIS, ASSIGNOR TO INTERNATIONAL HARVESTER COMPANY OF NEW JERSEY, A CORPORATION OF NEW JERSEY.

ENSILAGE-CUTTER DISTRIBUTER.

1,216,342.   Specification of Letters Patent.   Patented Feb. 20, 1917.

Application filed September 5, 1913. Serial No. 788,219.

*To all whom it may concern:*

Be it known that I, GEORGE M. MERWIN, a citizen of the United States, residing at Berwyn, in the county of Cook and State of Illinois, have invented certain new and useful Improvements in Ensilage - Cutter Distributers, of which the following is a full, clear, and exact specification.

My invention relates to ensilage cutter distributers.

It has for its object to facilitate the discharge and distribution of the material cut by an ensilage cutter. A more specific object of my invention is to improve the construction of distributers for ensilage cutters in such a manner that the maximum delivery capacity of the ensilage cutter is maintained and the ensilage is fed up through the pipe sections connected with the cutter and from them to a silo with a minimum of friction and without back firing; the distributer at the same time being readily operable so that its point of delivery may be varied at will. I attain these objects by providing an improved delivery member and improved distributing means coöperating therewith and adjustably attached thereto in an improved manner.

In the accompanying drawings I have shown one embodiment which my invention may assume in practice. It is to be understood, however, that the form of my invention shown herein for purposes of illustration may be modified.

In these drawings:

Figure 1 is an end elevation of an ensilage cutter equipped with this form of my improvement.

Fig. 2 is an enlarged detail view of the distributer mechanism.

Fig. 3 is a detail view of one of the distributer joints.

In the construction shown I have illustrated an ensilage cutter 1, which may be of any well known construction, having an upstanding delivery chute 2 receiving ensilage therefrom. Coöperating with this chute and mounted on the upper end thereof is a delivery pipe 3, while coöperating with this delivery pipe is an improved distributer 4, hereinafter described, and an improved supplemental distributer 5, likewise hereinafter described; the distributer members 4 and 5 being adjustably mounted with respect to the delivery pipe 3 and the member 5 being movable independently with respect to the member 4.

As shown in Figs. 1 and 2, the chute 2, which receives the ensilage from the ensilage cutter 1, may be formed in several parts or sections, these sections each being provided with locking collars 6 encircling their opposite ends and having fastening lugs 7 and adjustable screws 8 thereon adapted to clamp the collars on adjacent sections together in such a manner as to form a continuous chute or stack of any desired height. Obviously, in filling silos of different heights new sections may be inserted in this connection in such a manner as to raise the height of the delivery pipe 3 to the desired point.

Carried upon the upper end of this chute 2 is the delivery pipe 3. This pipe is shown to be fixed to the upper section of the chute 2 in the same manner that the latter is attached to its adjacent lower section. The construction of this delivery pipe is shown in detail in Fig. 2, the pipe having a neck curved in an arc of approximately 90° and being of substantially rectangular cross section throughout its length. As shown, this pipe is provided with an open throat 9 on the inner or groundward side thereof, which extends from a point substantially at the beginning of the arc to the free end of the same, while the back or upper wall of the same is so disposed that the ensilage passing up from the chute 2 is deflected gradually without a decided impact upon this wall in such a manner as to cause the ensilage to adhere to the shape of the pipe and pass out through the open end thereof.

The distributer 4 is pivoted by a hook 10 carried on the exterior of the back wall of the delivery pipe at a point near the free end of the latter. This member is provided with a cut-away portion 11 in its upper wall so that it may be slipped over the hook 10 and be supported by the latter and the pipe 3. As shown in Figs. 1 and 2, this distributer member receives the free end of the delivery pipe 3 and is tapered, being of substantially segmental section longitudinally and rectangular cross section transversely, and provided with an open mouth 12 at its upper end beneath the hook 10, within which the end of the delivery pipe 3 is receivable, and a tapered rounded delivery chute 13 at its lower end. It is to be noted that in this construction the distributing member 4 is free to move about its pivot on the hook 10, and in all its positions constitutes a continuation of the arcuate path through which the ensilage is directed by the delivery pipe 3. It is further to be noted that the arc of the distributer and the angle subtended thereby are smaller than those for the delivery pipe and that the increased width or transverse cross section of the distributer at a point below the end of the pipe 3 is such as to enable a large volume of ensilage to pass down through the same without choking while it is making the turn.

Coöperating with the distributer member 4 is a delivery section or second distributer member 5 preferably cylindrical in shape and preferably slightly contracted toward its lower end into the form of a truncated cone, although in certain constructions, however, the cross section of this distributer may be substantially uniform throughout its length. As shown, this member 5 incloses the free end of the chute 13 of the distributer member 4 and is attached thereto on opposite sides of the same by flexible means, such as chains 14, which are hooked over hooks 15 on the distributer 4; the flexible connection permitting an independent movement of the member 5 with respect to the member 4, in a plurality of directions, as shown in Fig. 2.

In the operation of the construction shown, when the material cut by the ensilage cutter is blown up through the pipe section 2, it passes out through the delivery pipe 3 in the usual manner, the ensilage in this instance, however, adhering to the arcuate path prescribed by the delivery pipe 3 and passing out of the latter into the distributer 4, where it is again guided through an arc-shaped path and deflected downward with a minimum of friction in such a manner that it passes evenly out of the chute 13 at the lower end of the distributer 5; the increased width of the distributer 4 at the curved portion thereof permitting the particles of ensilage that drop directly downward and fail to conform to the arcuate path prescribed, to fall through to the chute, thus avoiding any choking and back firing which would result in dropping the material upon the ground through the open throat 9 of the delivery pipe 3. Obviously, the operator in the silo may swing the distributer member 4 into any position, and, if desired, may use a plurality of the member 5, as shown in Fig. 1, the entire construction being so flexible that the range of movement of the member 4 or member 5 is practically unlimited and the entire surface of the interior of the silo may be reached in such a manner as to insure the even distribution of material thereto and the consequent increased capacity of the silo and better quality of the ensilage.

It is to be noted that in my improved construction the ensilage is guided through an arcuate path without a sharp break in any position of the distributer 4 or the delivery sections 5. It will further be noted that due to the chord-like bottom of the distributer member the ensilage is enabled to pass freely into the delivery section without choking at that point when the draft is lowered slightly. Attention is also directed to the fact that all danger of the filling of the section 5, distributer 4 and delivery pipes 3 and 2, and a consequent necessity for taking down the same in order that they may be cleaned, is also effectually prevented by the provision of the open throat on the delivery pipe 3, the ensilage falling out through this open throat when the draft drops below a predetermined strength and thus not only preventing filling of the pipes, but also warning the operator.

While I have in this application described one form which my invention may assume in practice, it is to be understood that the embodiment shown herein for purposes of illustration may be modified without departing from the spirit of my invention.

What I claim as my invention and desire to secure by Letters Patent is:

In a distributing mechanism, a delivery pipe having a curved upper end provided with an open throat, an inclosed distributer freely movable about a pivot on the delivery end of said pipe, said distributer being of arcuate conformation and having a chord-like bottom disposed in a single plane, and a delivery section operatively connected to the delivery end of said distributer.

In testimony whereof I affix my signature, in the presence of two witnesses.

GEORGE M. MERWIN.

Witnesses:
E. H. SMITH,
F. H. BAXTER.

Copies of this patent may be obtained for five cents each, by addressing the "Commissioner of Patents, Washington, D. C."